United States Patent Office 2,874,197
Patented Feb. 17, 1959

2,874,197
PERFLUOROSTYRENE DERIVATIVES

Stanley Dixon, Wilmington, Del., assignor to E. I. du Pont de Nemours and Company, Wilmington, Del., a corporation of Delaware No Drawing. Application March 10, 1955
Serial No. 493,609

5 Claims. (Cl. 260—651)

This invention relates to new fluoroolefins and more particularly to perfluoro and ω-hydroperfluorostyrenes.

Highly fluorinated organic compounds are unusual chemical compounds in that their chemistry differs markedly from their carbon-hydrogen analogues; the fluorine atoms greatly increasing the stability of the compounds and rendering them resistant to many reagents.

It is an object of this invention to provide novel fluorostyrene compounds. A further object is to provide new fluorine-containing styrene derivatives which may be converted to novel perfluoroalkyl stilbenes. A still further object is to provide a process for the preparation of these novel fluorostyrene compounds. Other objects will appear hereinafter.

These and other objects are accomplished by the following novel organic fluorine compounds having the general formula

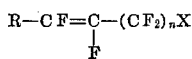

wherein R is a radical selected from the group consisting of phenyl and substituted phenyl radicals; X is a radical selected from the group consisting of fluorine and hydrogen and $n$ is a number from 1 to 18.

The compounds of the present invention are prepared by the reaction of an organo-lithium compound with a fluoroolefin of the general formula

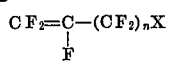

where X and $n$ have the values stated above. The organo-lithium compounds contain a carbon-lithium linkage, that is, the lithium is linked directly to a carbon atom of an organic radical, and may be represented by the formula RLi where R represents an organic radical in which the free valence belongs to a carbon atom. The organic radical may be a phenyl radical or any other substituted phenyl radical which is capable of forming a lithium derivative. Examples of substituted phenyl radicals which may be used are tolyl, xylyl, halogenophenyl, hydroxyphenyl, nitrophenyl, alkylaminophenyl, etc.

The perfluoroolefins which are useful in the process of the present invention may be prepared by the pyrolysis of the sodium salt of the corresponding acid as more particularly described in JACS, volume 73, page 4054 (1951). The ω-hydroperfluoroolefins which are useful in the process of the present invention may be prepared by telomerizing tetrafluorethylene with methanol as more particularly described in U. S. P. 2,559,628 to give the corresponding ω-hydroperfluoro alcohol. This alcohol is then oxidized to the corresponding ω-hydroperfluoro carboxylic acid. The pyrolysis of the sodium salt of this acid is then carried out to form corresponding ω-hydroperfluoroolefins.

As generally practiced, the organo-lithium compound is dissolved in an inert organic solvent and the fluoroolefin is slowly added to the solution, usually in excess of that required to complete the reaction with the organo-lithium compound, conveniently from about 10% to about 50% excess. It will be understood that the formation of the styrene derivative can be at least partially controlled by adjusting the stoichiometric amounts of reagents. It has been found, however, that both the styrene and stilbene derivative are always formed during the reaction, although the relative amounts of each will, of course, vary with reaction conditions.

Usually nitrogen is introduced with the fluoroolefin so as to provide and maintain a non-oxidizing atmosphere. The temperature employed will depend upon the fluorine-containing organic compound and generally will be such as to retain the material amount of the fluorine-containing organic compound in the solution and to avoid extreme pressure and the hazards involved therein. Preferably the temperature will be one in which the fluoroolefin is liquid at atmospheric pressure, that is, between its freezing point and its normal boiling point, although somewhat higher temperatures are sometimes convenient when a compound can be maintained liquid by the application of slight to moderate pressures. Ordinarily it is most convenient to operate at temperatures from about —30° C. to about —80° C. particularly with the lower boiling compounds.

The inert organic solvent employed generally will depend upon the temperature at which the reaction is to be carried out, and will be one which is liquid and hence retains its solvent properties at such temperature. Preferably, the solvent will be volatile so it can be readily separated from the product by evaporation or distillation, most of the products being relatively non-volatile. Ether is a particularly satisfactory inert solvent. Other suitable inert solvents include other ethers, petroleum ether and volatile saturated hydrocarbons generally, e. g. hexane and butane.

The reaction appears to take place rapidly as shown by the almost immediate precipitation of LiF from the solution. However, it is generally desirable to maintain the reactants in contact for some time to insure maximum yields. Then the reaction mixture will usually be brought substantially to room temperature for separation of the lithium fluoride. The LiF may be removed by filtration or by treatment with an aqueous solution of hydrochloric acid which reacts with any lithium hydroxide that may be formed by hydrolysis of any unreacted organo-lithium compound and simultaneously dissolve the LiF.

When the lithium fluoride is removed by filtration, the solvent will be removed by evaporation or distillation and the residue subjected to fractional distillation to recover the product. When the reaction mixture is treated with aqueous hydrochloric acid, it will usually be desirable to first remove the solvent and then extract the aqueous solution with ether or other solvent. The resulting extracts can then be subjected to evaporation and fractional distillation to recover the product.

The following examples will better illustrate the nature of the present invention; however, it is to be understood that the invention is not intended to be limited to these examples. Parts are by weight unless otherwise indicated.

*Example I.—Reaction of phenyl lithium with perfluoropropene*

A solution of phenyl lithium (38 g.) in ether (650 cc.) is cooled to —80° C. and a mixture of perfluoropropene and nitrogen slowly passed in until a total of 80 g. (10% excess) of the olefin has been added. The solution is then allowed to warm up to room temperature at which time it is treated with water and dilute hydrochloric acid. The aqueous layer is extracted several times with ether and the extracts dried over calcium sulfate. Evaporation of the ether yields a brown liquid which is fractionated as follows Cut No. 1—B. P. 148° C. at 760 mm., 53 g.
Cut No. 2—B. P. 130–133° C., at 12 mm., 20 g.

Cut No. 1 is the required phenyl pentafluoropropene, more particularly 1-phenyl perfluoropropene-1 (IA), a water white liquid.

Found: C, 51.5; H, 2.6%; M. W. 207 in CCl$_4$. C$_9$H$_5$F$_5$ requires C, 51.9; H, 2.4%; M. W. 208.

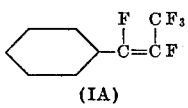

(IA)

Cut No. 2 solidifies on cooling and, when recrystallized from petroleum ether (30–60° C.) yields long colorless needles, M. P. 38° C. It is 1:2-diphenyl perfluoropropene-1 (IB).

Found: C, 68.0; H, 3.8%; M. W. 268. C$_{15}$H$_{10}$F$_4$ requires: C, 67.7; H, 3.7%; M. W. 266.

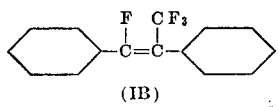

(IB)

*Example II.—Reaction of phenyl lithium with perfluoroheptene-1*

To a solution of phenyl lithium (10 g.) in ether (100 cc.), cooled to −80° C., is added, dropwise, perfluoroheptene-1 (40 g.), a nitrogen atmosphere being maintained throughout. When all the olefin is added, stirring is continued for 2 hours, and the mixture then allowed to warm to room temperature, at which point water is added. The ether layer is separated, and the aqueous layer extracted several times with more ether. The combined extracts are dried and evaporated to yield a dark brown oil, part of which crystallizes.

The oil is distilled to yield two fractions:

Cut No. 1—B. P. 80° C. at 6 mm., 19 g.
Cut. No. 2—B. P. 106° C. at 6 mm., 8 g., solidifies Cut No. 1 is shown by analysis to be the mono phenyl derivative (IIA).

Found: C, 38.5; H, 1.2%. C$_{13}$H$_5$F$_{13}$ requires C, 38.3; H, 1.2%.

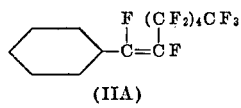

(IIA)

Cut No. 2 is shown by analysis to be the diphenyl derivative (IIB):

Found: C, 48.8; H, 2.3%. C$_{19}$H$_{10}$F$_{12}$ requires: C, 48.9; H, 2.1%.

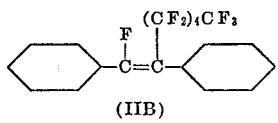

(IIB)

The diphenyl compound may be recrystallized from alcohol-water to give long colorless needles, M. P. 73° C.

*Example III.—Reaction of phenyl lithium with 8-hydroperfluorooctene-1*

An ether solution (500 cc.) of phenyl lithium (15 g.) is cooled to −80° C. and treated with 8-hydroperfluorooctene-1 (68 g.) in a nitrogen atmosphere. When the addition of olefin is complete, the reaction is allowed to warm to room temperature and it is then treated with water (100 cc.) and enough hydrochloric acid to produce a clear solution. The ether layer is separated and the aqueous layer extracted with ether several times. The combined extracts are dried and finally evaporated to yield a brown liquid. Fractional distillation yields 8-hydro-1-phenyl perfluorooctene-1 (IIIA), B. P. 72° C. at 2 mm. (22 g.) and 8-hydro-1:2-diphenyl perfluorooctene-1 (IIIB), B. P. 138° C. at 2 mm. (16 g.). The diphenyl derivative is recrystallized from aqueous alcohol to form long white needles, M. P. 69° C.

(IIIA) Found: C, 37.6; H, 1.5%. C$_{14}$H$_6$F$_{14}$ requires: C, 38.2; H, 1.5%.

(IIB) Found: C, 48.4; H, 2.3%. C$_{20}$H$_{11}$F$_{13}$ requires: C, 48.2; H, 2.2%.

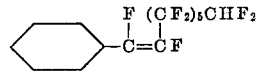

(IIIA)

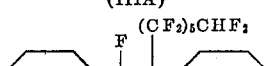

(IIIB)

*Example IV.—Reaction of phenyl lithium with ω-hydroperfluoro-dodecene-1*

To a solution of phenyl lithium (9 g.) and ether (200 cc.) cooled to −60° C. is slowly added an ether solution of ω-hydroperfluoro-dodecene-1 (60 g.) in ether (70 cc.), a nitrogen atmosphere being maintained throughout. After all the olefin has been added (30 minutes), stirring is continued for an additional 60 minutes, after which time it is allowed to warm to room temperature. Water and hydrochloric acid are added to produce a clear mixture. The ether layer is separated and the aqueous layer extracted six times with ether. The combined ether extracts are dried (calcium sulfate) and evaporated to yield a light brown syrup which is fractionally distilled.

Cut No. 1—B. P. 96° C. at 28 mm., unchanged olefin, 33 g.
Cut No. 2—B. P. 100–105° C. at 2 mm., solidifies on cooling 6 g.
Cut No. 3—B. P. 155° C. at 2 mm., solidifies on cooling, 8 g.

Cut No. 2 is recrystallized from aqueous methanol to give colorless plates, M. P. 49° C. of 12-hydro-1-phenyl-perfluoro-dodecene-1 (IVA).

Found: C, 33.3; H, 0.96%. C$_{18}$H$_6$F$_{22}$ requires: C, 33.7; H, 0.94%.

Cut No. 3 is recrystallized from methanol to give long colorless needles, M. P. 69° C. of 12-hydro-1:2-diphenyl-perfluoro-dodecene-1 (IVB).

Found: C, 41.9; H, 1.57%. C$_{24}$H$_{11}$F$_{21}$ requires: C, 41.3; H, 1.58%.

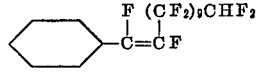

(IVA)

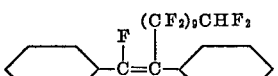

(IVB)

While the invention has been illustrated by means of the above examples, it is to be understood that the compounds encompassed within the scope of the present invention are those mono and diaryl perfluoro and ω-hydroperfluoro olefins in which the length of the alkyl chain attached to the olefinic carbon atom may vary from one to eighteen carbon atoms. Although straight alkyl chains are preferred, branched perfluoroalkyl and branched ω-hydroperfluoroalkyl chains are included in this invention. The aromatic portion of the compounds may be a phenyl or substituted phenyl radical. This will include such aromatic groups as tolyl, xylyl, halogenophenyl, hydroxyphenyl, nitrophenyl, alkylaminophenyl and other substituted phenyl radicals which are capable of forming a lithium derivative.

The new fluorine containing mono aryl derivatives of the present invention, although olefinic in nature, are heat stable and as described above, are useful as intermediates to new fluorine-containing diaryls by a further reaction of the mono aryl derivative with an organo lithium compound. These diaryls on oxidation may be converted to fluoroketones. The mono aryl derivatives are non-corrosive and have excellent resistance to acids and bases. In addition, they are non-flammable and cause little or no swelling action on rubber and synthetic elastomer materials. For this reason, the perfluoroalkyl and ω-hydroperfluoroalkyl styrenes of this invention are valuable fluids for hydraulic systems, particularly those systems where operating conditions are at high temperatures or require corrosive chemicals or both. Thus, the styrenes of this invention which are liquids at room temperature or low melting solids are valuable for use in hydraulic systems in industrial fork-lift trucks, in ships, in steel making machinery, metal fabricating devices, in planes because of non-flammability, etc.

This application is a continuation-in-part of copending application Serial No. 374,450, filed August 14, 1953.

As many apparently widely different embodiments of this invention may be made without departing from the spirit and scope thereof, it is to be understood that this invention is not limited to the specific embodiments thereof except as defined in the appended claims.

What is claimed is:

1. Organic fluorine compounds having the general formula

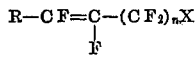

wherein R is a radical selected from the group consisting of phenyl and a substituted phenyl radical taken from the group consisting of tolyl, xylyl, halogenophenyl, hydroxyphenyl, nitrophenyl, and alkylaminophenyl, X is a radical selected from the group consisting of fluorine and hydrogen and $n$ is a number from 1 to 18.

2. An organic fluorine compound having the general formula

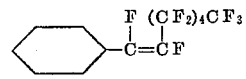

3. An organic fluorine compound having the general formula

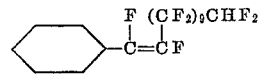

4. An organic fluorine compound having the general formula

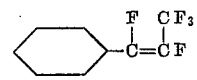

5. An organic fluorine compound having the general formula

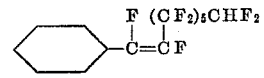

References Cited in the file of this patent

UNITED STATES PATENTS 2,612,528    Cohen _____ Sept. 30, 1952